United States Patent
Petersen

(10) Patent No.: US 8,176,552 B2
(45) Date of Patent: May 8, 2012

(54) COMPUTER SYSTEM, COMPUTER PROGRAM PRODUCT AND METHOD FOR ASSESSING A PROFILE OF A COMPUTER SYSTEM

(75) Inventor: Michael Petersen, Bad Lippspringe (DE)

(73) Assignee: Fujitsu Siemens Computers GmbH, Munich (DE)

( * ) Notice: Subject to any disclaimer, the term of this patent is extended or adjusted under 35 U.S.C. 154(b) by 709 days.

(21) Appl. No.: 12/262,381

(22) Filed: Oct. 31, 2008

(65) Prior Publication Data

US 2009/0119501 A1   May 7, 2009

(30) Foreign Application Priority Data

Oct. 31, 2007 (DE) .................. 10 2007 052 180

(51) Int. Cl.
G06F 21/00 (2006.01)
(52) U.S. Cl. .............................. 726/22; 726/30; 717/168
(58) Field of Classification Search .................. 726/22, 726/30; 717/168
See application file for complete search history.

(56) References Cited

U.S. PATENT DOCUMENTS

| | | | | |
|---|---|---|---|---|
| 6,122,741 A | * | 9/2000 | Patterson et al. | 726/17 |
| 7,127,067 B1 | * | 10/2006 | Wachtler et al. | 380/255 |
| 7,614,046 B2 | * | 11/2009 | Daniels et al. | 717/170 |
| 7,881,967 B1 | * | 2/2011 | Srinivasan et al. | 709/220 |
| 2002/0184619 A1 | | 12/2002 | Meyerson | |
| 2003/0037324 A1 | * | 2/2003 | Kong et al. | 717/173 |
| 2004/0003389 A1 | * | 1/2004 | Reynar et al. | 717/178 |
| 2004/0068721 A1 | * | 4/2004 | O'Neill et al. | 717/168 |
| 2004/0145766 A1 | * | 7/2004 | Sugishita et al. | 358/1.13 |
| 2004/0267548 A1 | | 12/2004 | Jones | |
| 2005/0091651 A1 | | 4/2005 | Curtis et al. | |
| 2005/0262225 A1 | * | 11/2005 | Halpern et al. | 709/220 |
| 2005/0283622 A1 | * | 12/2005 | Hall et al. | 713/190 |
| 2006/0069754 A1 | * | 3/2006 | Buck et al. | 709/220 |
| 2006/0080656 A1 | * | 4/2006 | Cain et al. | 717/174 |
| 2006/0101450 A1 | * | 5/2006 | Datta et al. | 717/168 |
| 2006/0101457 A1 | * | 5/2006 | Zweifel et al. | 717/174 |
| 2006/0117310 A1 | * | 6/2006 | Daniels et al. | 717/168 |
| 2006/0184714 A1 | | 8/2006 | Dang et al. | |
| 2006/0277184 A1 | * | 12/2006 | Faitelson et al. | 707/9 |
| 2007/0054662 A1 | * | 3/2007 | Dillinger et al. | 455/423 |
| 2007/0061125 A1 | * | 3/2007 | Bhatt et al. | 703/20 |
| 2007/0157311 A1 | * | 7/2007 | Meier et al. | 726/22 |
| 2007/0192763 A1 | | 8/2007 | Helvick | |
| 2008/0155526 A1 | * | 6/2008 | Gokhale | 717/169 |

FOREIGN PATENT DOCUMENTS

WO   WO 02/097630 A2   12/2002

OTHER PUBLICATIONS

"AIX Version 3.2—System Management Guide: Operating System and Devices," XP002067192, Chapter 14: System Accounting, Oct. 1, 1993, pp. 14-1-14-29.

* cited by examiner

*Primary Examiner* — Michael Pyzocha
(74) *Attorney, Agent, or Firm* — Slater & Matsil, L.L.P.

(57) ABSTRACT

A method for maintaining a computer system on the basis of an access profile and a change profile is disclosed. The computer system includes at least one workstation computer and a maintenance computer. The invention further relates to a method for providing an access profile and a method for assessing a software correction.

20 Claims, 8 Drawing Sheets

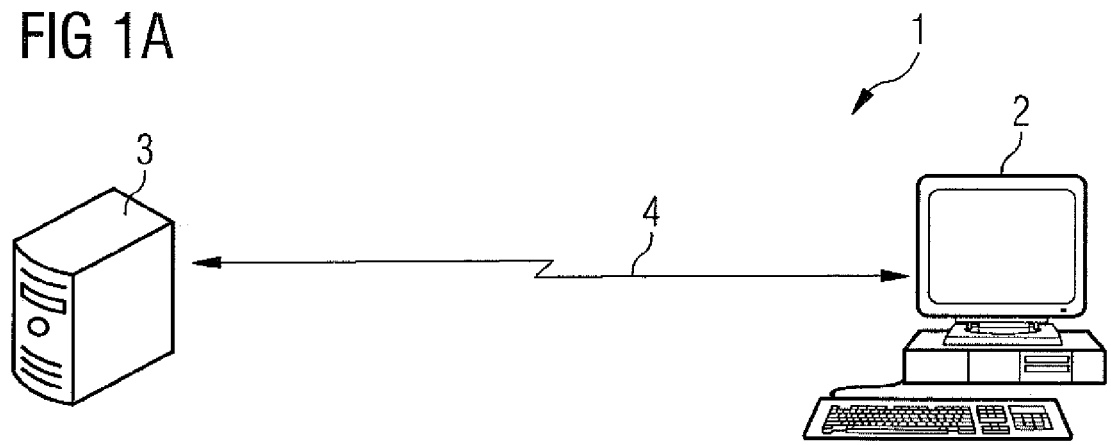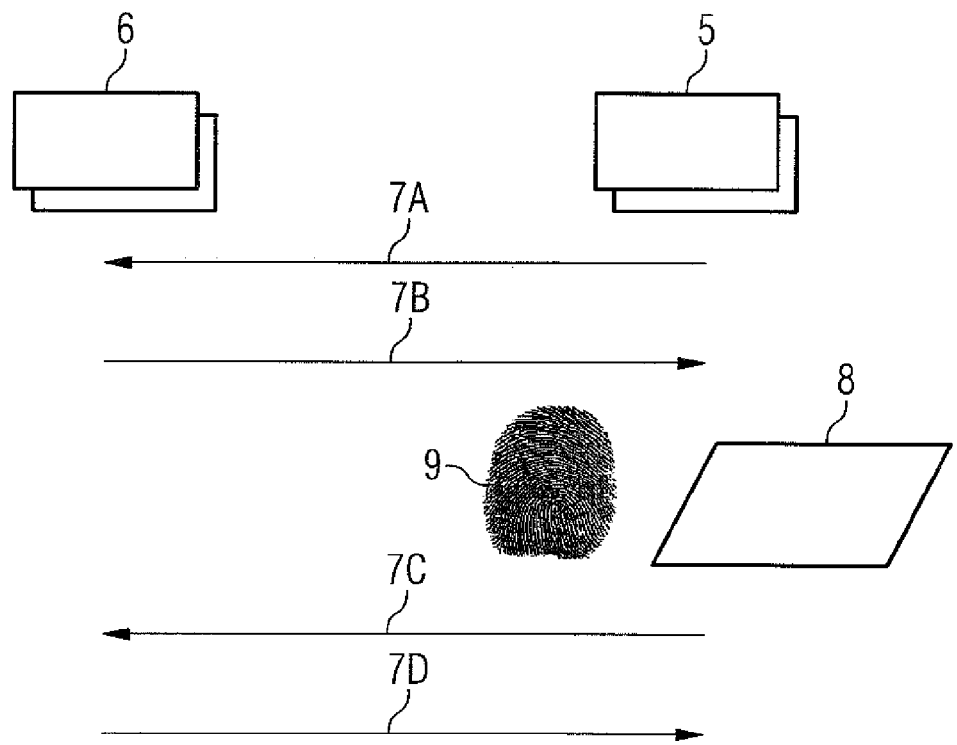

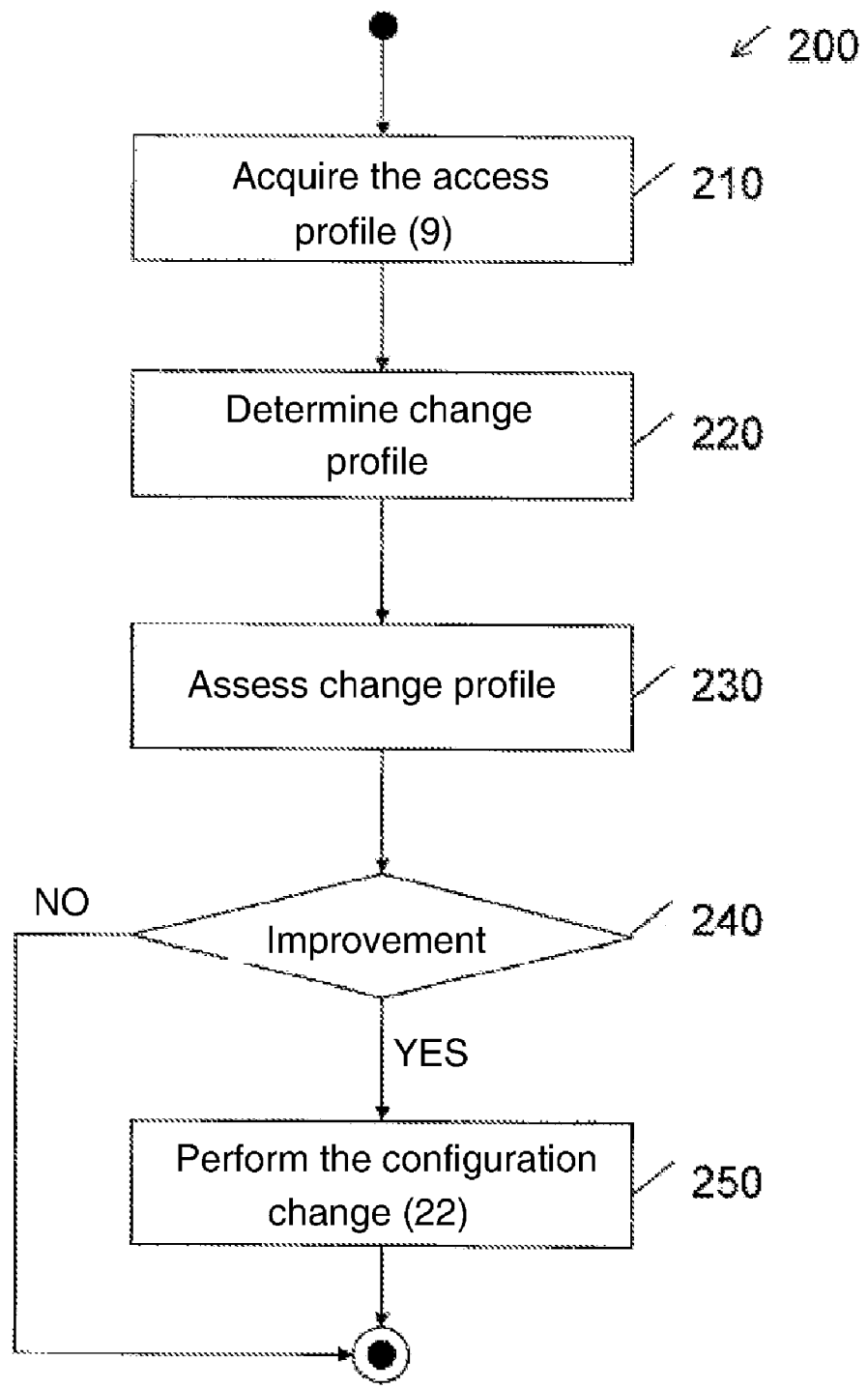

COMPUTER SYSTEM, COMPUTER PROGRAM PRODUCT AND METHOD FOR ASSESSING A PROFILE OF A COMPUTER SYSTEM

This application claims priority to German Patent Application 10 2007 052 180.6, which was filed Oct. 31, 2007 and is incorporated herein by reference.

TECHNICAL FIELD

The invention relates to a method for maintaining a computer system with at least one software component. The invention further relates to a method for providing an access profile and a method for assessing a software correction. The invention further relates to a computer system and a computer program product.

BACKGROUND

Modern computer systems serve for running a number of applications and other software components. The software components installed on a computer system generally do not remain constant; rather, they change from time to time. For instance, additional applications or device drivers can be installed. Conversely, previously installed software components can be removed from a computer system.

Moreover, software components often contain errors or other defects, which can be remedied by the installation of so-called error corrections, also called bug fixes or patches.

Particularly in large computer systems, it is increasingly difficult to decide which error correction or other configuration changes can, should or must be made to the computer system. The installation of an incorrect version of an error correction can possibly lead to a malfunction or failure of an associated application. The installation or removal of accessory applications can also have a negative effect on other installed software components.

SUMMARY

In one aspect, the invention describes a method for improving the operating security of computer systems. In particular embodiments, a method for maintaining a computer system and a computer suitable for effecting the method are to be described.

A first embodiment provides a method for maintaining a computer system that includes the following steps:
  acquisition of at least one access profile for at least one software component installed on the computer system,
  determination of at least one change profile for at least one configuration change,
  assessment of the at least one determined change profile with respect to the operating security of the computer system on the basis of the at least one access profile,
  performance of the at least one configuration change only if the assessment yields an improvement of the operating security.

By determining and assessing a change profile with respect to the operating security of a computer system on the basis of an access profile, the effects of a configuration change on a computer system can be recognized before performing the configuration change.

Accesses occurring in the computer system, in particular, to files and other resources, are acquired by the access profile in order to characterize the computer system before performance of the configuration change. The change profile comprises information on the configuration change to be performed, in particular, the files and other resources changed by it, and characterizes the configuration change itself.

According to an advantageous implementation, the at least one configuration change comprises at least one error correction for a software component to be corrected, the error correction being installed on the computer system only if the at least one access profile comprises at least one access to the software component to be corrected. By assessing the access profile for accesses to a software component to be corrected, an unnecessary installation of error corrections for unneeded software components can be avoided.

According to another advantageous implementation, incompatibility information for the at least one configuration change with respect to an affected software component is determined in the step of determining the at least one change profile. The configuration change will be performed in the computer system only if the access profile comprises no access to the affected software component. The making of possibly harmful configuration changes can be avoided by examining the access profile for incompatibilities caused by the configuration change.

According to another advantageous implementation, a priority for the configuration change is determined in the step of determining the at least one change profile, the at least one configuration change being performed in the computer system only if the determined priority exceeds a predetermined threshold value. By determining a priority of a configuration change, the importance of the change can be ascertained.

According to another advantageous implementation, a plurality of access profiles are acquired and a plurality of software components are detected, and which of the plurality of software components are influenced by the configuration change is determined in the assessment of the at least one change profile. By analyzing a plurality of access profiles, mutual influences of software components can be recognized and taken into account in the performance of the configuration changes.

According to another advantageous implementation, the computer system comprises at least one workstation computer and at least one maintenance computer that are coupled to one another via a data network, wherein the at least one access profile is transmitted by the at least one workstation computer to the at least one maintenance computer. By using separate workstation computers and maintenance computers, remote maintenance of a workstation can be carried out.

According to another advantageous implementation, the computer system comprises a plurality of workstation computers, each workstation computer transmitting at least one access profile to the maintenance computer, and the maintenance computer determining which of the workstation computers will be affected by the at least one configuration change. By determining different interactions for different workstation computers, an individual decision can be made for each of the plurality of workstation computers.

According to another advantageous implementation, the assessment of operating security is determined separately for different groups of workstation computers, and the at least one configuration change is performed only on the workstation computers of those groups for which an improvement of operating security was determined. By determining different groups of workstation computers, a further improvement of the operating security of the computer system as a whole can be achieved.

According to another advantageous implementation, a set of critical software components is determined on the basis of access profiles of the plurality of workstation computers, and the effect of the configuration change on the critical software components is determined in the step of assessing the operating security. By determining critical software components, the effect of the configuration change on particularly critical software components can be ascertained.

According to another advantageous implementation, a first assessment score for the operating security of the computer system is determined before performance of the configuration, and a second assessment score for the operating security is determined after performance of the configuration change, the configuration change being assigned a quality score on the basis of the first and second assessment scores. The quality of the configuration change that has been performed can be determined by a comparison of the assessment scores of after the performance of a configuration change.

According to another advantageous implementation, the quality score is compared to a predetermined target value, and if it falls below the target value, the configuration change is reversed. By comparing an ascertained quality score to a predetermined quality goal, a configuration change can be reversed if a predetermined quality goal was not achieved.

According to another advantageous implementation, the quality score is taken into account in the assessment of a further configuration change. By taking the configuration change into account in the assessment of a further configuration change, experience gained in the past can be taken into account in the assessment of new configuration changes.

The problem is likewise solved by a method for the provision of an access profile by a monitoring component of a computer system that includes the following steps:
  monitoring accesses to resources of the computer system,
  assigning the monitored accesses to at least one software component from which the accesses originate that is installed on the computer system,
  acquiring access data of the assigned accesses,
  preparing an access profile comprising the acquired access data, and
  providing the prepared access profile to an assessment component of the computer system.

An access profile for an assessment of a configuration change can be prepared by a method with the above steps.

The underlying problem is likewise solved by a method for the assessment of a software correction by an assessment component of a computer system comprising the following steps:
  reading a configuration change comprising a plurality of data elements,
  assigning the data elements to resources of the computer system,
  preparing a change profile for the configuration change on the basis of the assigned data elements,
  reading at least one access protocol of a software component, comprising a plurality of data on accesses to resources of the computer system,
  analyzing which access data of the access profile is influenced by the prepared change profile,
  assessing the configuration change with respect to the operating security of the computer system, based on the analysis of the access data.

The influence of a configuration change on a computer system with a previously acquired access profile can be determined by a method with the above steps.

The underlying problem is likewise solved by a computer program product comprising executable program code, wherein one of the methods specified above is performed on a computer system when the program code is executed.

Additional details and implementations of the invention are specified in the subordinate claims.

BRIEF DESCRIPTION OF THE DRAWINGS

With the aid of figures, the invention will be described in detail below on the basis of embodiments. In the figures:

FIG. 1A shows a computer system with a workstation computer and a maintenance computer;
FIG. 1B shows a data exchange between the workstation computer and the maintenance computer;
FIG. 2 shows a flowchart of a method for maintaining a computer system.

Figure 3:
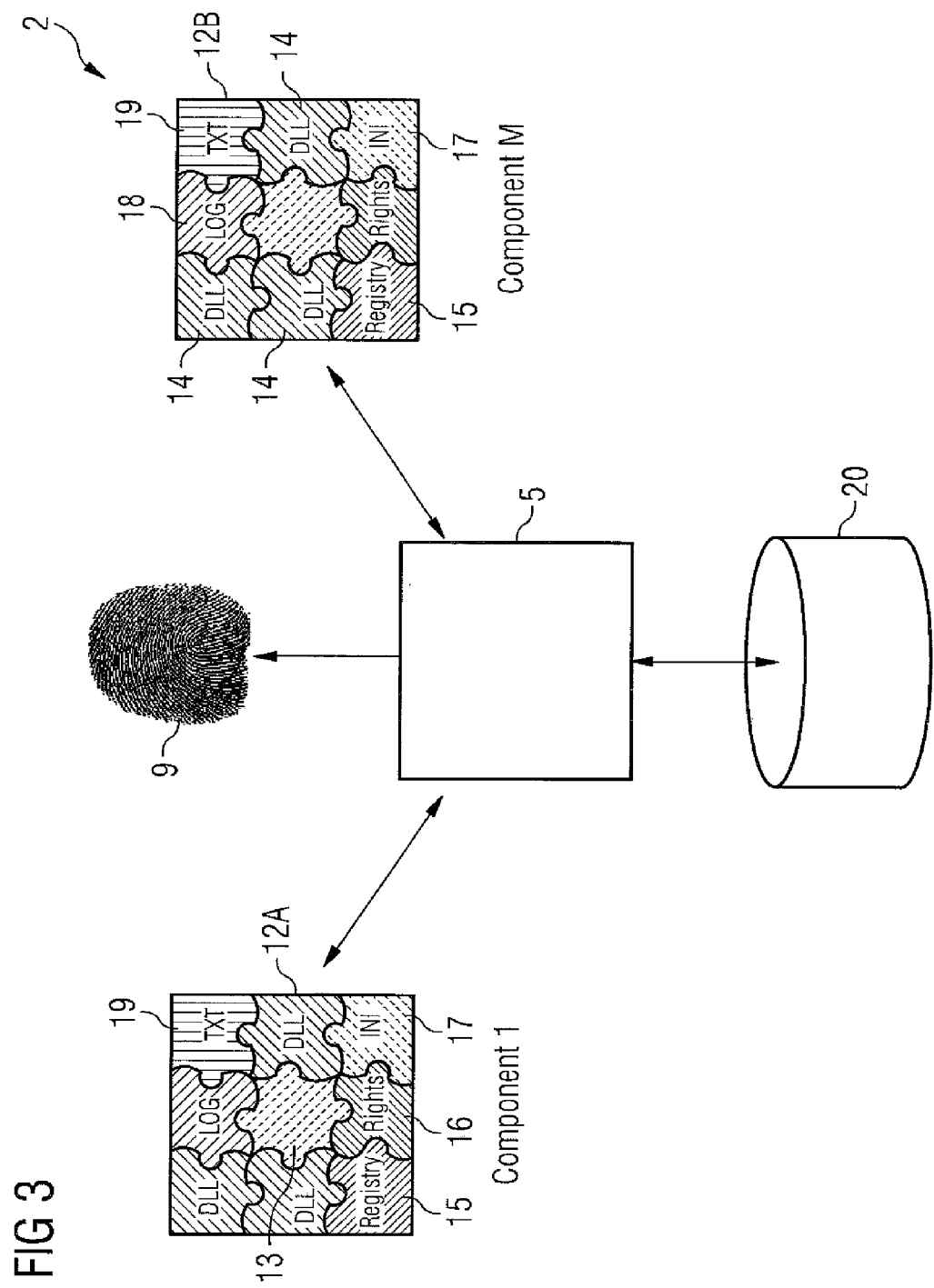
FIG. 3 shows a monitoring component for providing an access profile.

The following reference numbers can be used in conjunction with the drawings:
  1 Computer
  2 Workstation computer
  3 Maintenance computer
  4 Data network
  5 Monitoring component
  6 Assessment component
  7 Message
  8 Access data
  9 Access profile
  12 Software component
  13 Executable component
  14 Library component
  15 Registration information
  16 Access right
  17 Initialization information
  18 Event log
  19 Other subcomponents
  20 Storage device
  21 Maintenance database
  22 Configuration change
  23 Dataset
  24 Assessment score
  25 Maintenance system
  27 Service module
  28 Examination module
  29 Software management module
  30 Software management database
  31 Inspection module
  32 Report
  33 Evaluation module
  34 Risk management module
  35 Change management module

DETAILED DESCRIPTION OF ILLUSTRATIVE EMBODIMENTS

FIG. 1A shows a computer system 1. The computer system 1 comprises a workstation computer 2 and a maintenance computer 3. The workstation computer 2 and the maintenance computer 3 are connected to one another via a data network 4.

The workstation computer 2 and the maintenance computer 3 can be so-called personal computers, workstations or server computers, for example. The data network 4 can be, for example, a company-internal local area network (LAN) or a site-spanning network (WAN), via which a plurality of workstation computers 2 are connected to one or a few maintenance computers 3.

FIG. 1B shows an example of a data flow between the workstation computer 2 and the maintenance computer 3. In the illustrated embodiment, a monitoring component 5 is installed on the workstation computer 2. An assessment component 6 is installed on the maintenance computer 3.

For example, the monitoring component 5 and the assessment component 6 can be software programs installed on the workstation computer 2 or the maintenance computer 3, respectively. It is also possible, however, to implement the monitoring component 5 or the assessment component 6 by a combination of hardware and software.

With a first message 7A, the monitoring component 5 transmits a presence signal to the assessment component 6. For instance, a so-called "heartbeat signal" at regular time intervals can be transmitted from the workstation computer 2 to the maintenance computer 3 in order to enable failure monitoring by the maintenance computer 3. Together with the first message 7A, additional status information can also be transmitted from the monitoring component 5 to the assessment component 6. For example, problems or faults occurring on the workstation computer 2 can be reported together with the first message 7A.

With a second message 7B, the assessment component 6 transmits a request for transmission of access data 8 to the monitoring component 5. For example, newly accumulated access data 8 of the workstation computer 2 can be queried by the second message 7B. Alternatively, it is possible to query all access data 8 stored on a workstation computer 2.

The monitoring component 5 prepares an access profile 9 that comprises the access data 8 requested by means of the second message 7B. The monitoring component 5 can call up the data requested with the second message 7B from an internal database, a protocol file, also called a log file, or via a system interface.

With a third message 7C, the access profile 9 compiled by the monitoring component 5 is transmitted to the assessment component 6. Thus, the access profile 9 compiled by the monitoring unit 5 is available locally for further evaluation by the assessment component 6.

If the access profile 9 was correctly received by the assessment component 6, and if it contains the access data 8 requested by means of the second message 7B, the reception of the access profile 9 is confirmed to the monitoring component 5 with a fourth message 7D.

The computer system 1 illustrated in FIGS. 1A and 1B comprises only a single workstation computer 2. It goes without saying that the maintenance method described below is also suitable for those computer systems that comprise a plurality of workstation computers 2. Particularly, in the acquisition of a plurality of access profiles 9 of a plurality of workstation computers 2, advantages in the performance of configuration changes by the maintenance computer 3 result from a central assessment of the acquired access profiles 9.

FIG. 2 shows a schematic flowchart of a method 200 for maintaining a computer system 1. The method 200 is suitable, for example, for maintaining the computer system 1 illustrated in FIG. 1A.

In a first step 210, an access profile 9 is acquired for at least one software component 12. Accesses of the software components 12 to resources of the workstation computer 2 are acquired in the step 210 and recorded in the access profile 9. The details of the monitoring will be explained later with reference to FIG. 4. The software component 12 can, for example, be an application program that includes a number of executable files, system settings, and other subcomponents. Additional possible details of the step 210 will be described later with reference to FIG. 4.

The method 200 illustrated in FIG. 2 further comprises a step 220. In the step 220, a change profile is determined for at least one configuration change of the computer system 1.

For example, the assessment component 6 of the maintenance computer 3 can read a so-called error correction and determine its associated data elements. As a rule, error corrections contain new or supplementary subcomponents for a software component 12 already installed on a workstation computer 2. For example, parts or all of a library component 14 can be replaced by a newer version of the corresponding library component by means of a software correction.

It is also possible, however, to analyze other configuration changes, affecting a restriction or expansion of the access rights 16 for instance, and to determine a change profile resulting therefrom.

In an additional step 230, the change profile determined in the step 220 is assessed. In particular, an access profile 9 previously acquired by the monitoring component 5 is taken into account in the assessment of the change profile.

It is analyzed in the step 230, for example, whether a file of a software component 12 replaced by the error correction is used at all. It can additionally be determined whether a change of access rights renders accesses performed by a software component 12 impossible.

Additional possible details of the steps 220 and 230 will be described later with reference to FIG. 6.

In an additional step 240, it is determined whether the assessment of the change profile carried out in the step 230 results in an improvement or a deterioration of the operating security of the computer system.

In a particular example, the risk that accompanies the performance or nonperformance of a configuration change is ascertained in order to determine the operating security. Such a risk exists in principle whenever resources or subcomponents that are used by existing software components 12 are changed. There is a particularly high risk if individual subcomponents are removed without replacement, or if access rights are limited. If only additional subcomponents are added, the risk of affecting existing software components 12 remains small.

Another possible factor in the assessment is the frequency and type of use of an existing part of a software component 12. For example, there is great danger to the operating security of the computer system if central software components 12 or parts thereof are removed. The functioning of a company network, for instance, can be greatly curtailed if central services such as an e-mail or directory service are removed.

According to one implementation of the invention, quality information regarding a planned configuration change is automatically retrievable. For example, a producer or distributor of an error correction can provide importance such as "security-critical" or "non-security-critical expansion of functions," or a certification such as "extensively tested" or "untested prerelease version." Of course, such information and other information can also be provided manually if it is only contained in the documentation for the configuration change, for instance.

An additional possible decision criterion is the reversibility of the configuration change. If an error correction contains a utility program, for example, with which the original state before installation of the error can be re-created, the installation carries a smaller risk than if recovery is possible only manually or not at all.

Based on the various types of information mentioned above, the assessment component 6 decides whether a possible configuration change must be performed immediately on all or at least some of the workstation computers 2, whether it can be postponed to a later time entirely or in part, whether a preliminary manual assessment by an expert, optionally after performing a test installation on an isolated workstation computer 2, is necessary, or whether performance of the change can or should be permanently forgone.

If the performance of the configuration change would lead to a deterioration of the operating security of the computer system 1, the method illustrated in FIG. 2 terminates. If it is determined, however, that the performance of the analyzed configuration change would lead to an improvement of operating security, the configuration change is carried out in a subsequent step 250. For example, an error correction can be installed on one workstation computer 2 of the computer system 1.

FIG. 3 shows a schematic representation of a workstation computer 2. The workstation computer 2 comprises two software components 12A and 12B, which are installed on the workstation computer 2. The workstation computer 2 further comprises a monitoring component 5 and a storage device 20.

The monitoring component 5 can be a monitoring program set up on the computer system 1 that monitors accesses of the software components 12 to interfaces of an operating system, for example. The storage device 20 can be a local hard disk of the workstation computer 2, for instance, or a database system connected to the workstation computer 2.

The software components 12A and 12B illustrated in FIG. 3 each contain an executable component 13, several library components 14, registering information 15, access rights 16, initialization information 17, an event log 18, as well as other subcomponents 19.

For example, the executable component 13 can be a so-called EXE or COM file with program code executable by a processor of the workstation computer 2, or a script file. The library component 14 can be application-specific or higher-level libraries such as so-called DLL libraries, which likewise contain executable program code. The registering information 15, for instance, can be entries in the so-called Windows registry or in another directory service in which presets and other data for the software component 12 are stored. The access rights 16 for example, can be access rights for reading, writing or modifying files or directories on the data medium of the workstation computer 2. The initialization information 17 can be settings that are used in the startup of the software component 12. Accesses to the resources of the workstation computer 2, errors and warnings that have occurred, or trace files can be stored in the event log 18. The other subcomponents 19 can be, for example, help files belonging to the software component 12, text files or files, directories or links processed by the software component 12.

As illustrated in FIG. 3, several software components 12 are often installed on a workstation computer 2. For instance, a number of application programs, driver programs and system components of an operating system can be installed on the workstation computer 2. Additionally, enhancements of the individual application programs, drivers and system components can be installed on the workstation computer 2. Of course, not every software component 12 need comprise all subcomponents illustrated in FIG. 3.

During the operation of the workstation computer 2, the monitoring component 5 monitors all or a predetermined number of the accesses of the software components 12 to system resources of the computer system 1. Resources in the sense of the present application can represent, for instance, accesses to hardware components such as hard disks, network or graphics cards or other hardware devices connected to the workstation computer 2. The resources can also be software components 12 installed on the workstation computer 2. It is possible, for example, that the first software component 12A accesses the second software component 12B in order to successfully carry out a task. Other accesses, such as those to software services provided on or via the data network 4, such as Web services, or error messages that occur, can be monitored by the monitoring components 5.

Figure 4:
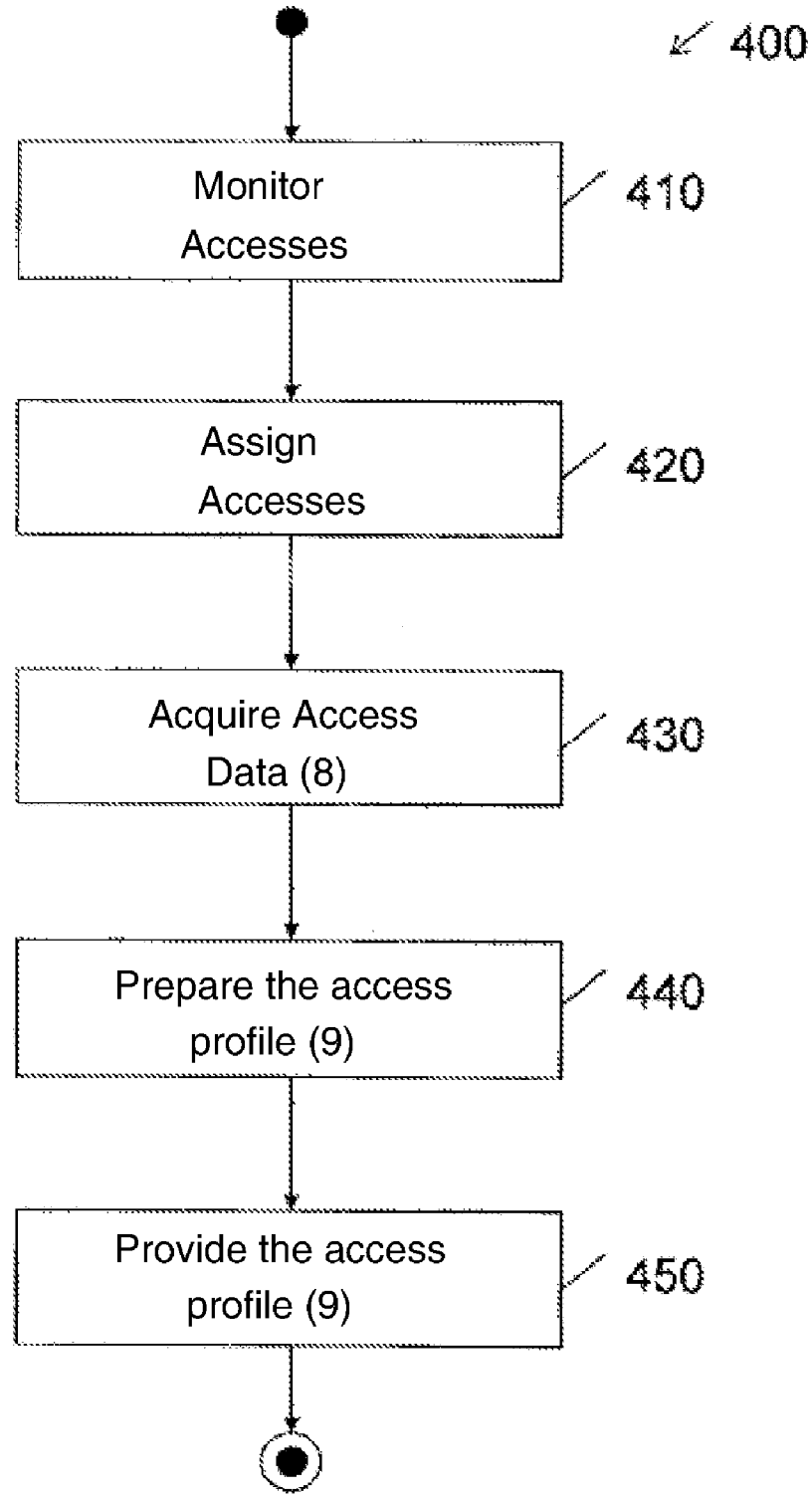
FIG. 4 shows a flowchart of a method for providing an access profile.

FIG. 4 shows a flowchart of a method for providing an access profile 9. The method 400 is suitable for execution on the workstation computer 2 shown in FIG. 3.

In a step 410, accesses of individual software components 12 are monitored by the monitoring component 5. For example, the monitoring component 5 can mount itself for this purpose by means of so-called Windows hooks and hardware or software interfaces such as the so-called hardware abstraction layer of the operating system, and then monitor write and read accesses or requests for opening and closing of files and other resources. Other monitoring possibilities, such as the manipulation of driver programs for accessing resources, or the evaluation of log files, are possible as well.

In a step 420, the accesses recognized in the monitoring are assigned to one of the software components 12. By comparing an origination address of the request to a current memory allocation of the computer, for instance, one can determine the software component 12 installed on the workstation computer 2 from which the access request initially came. Alternatively, analysis of the so-called call stack can be performed.

In a step 430, the access data 8 for the access is acquired. It can be determined, for instance, which resources are accessed, how long the access lasts, in what order the access followed or preceded another access, or how much data was transferred during the access. Other data connected with the access can also be acquired by the monitoring component 5 in the step 430. For example, version or correction information of the software component 12 or its parts can be acquired, their location in memory, size or creation date can be determined, or a check of the files, for example, by means of a so-called CRC checksum, can be performed.

The table below shows a set of access data 8 that was acquired during the execution of a software component 12:

| Resource | Accesses | Duration |
| --- | --- | --- |
| C:\Program Files\Application 1\EXE 1 | 2 | 30 min |
| C:\WIN\DLL SYS | 10 | 4 min |
| C:\WIN\system32\DLL SYS | 13 | 16 min |
| C:\Program Files\Application 1\DLL 1 | 3 | 2 min |
| C:\Program Files\Application 1 Registry | 3 | 1 min |
| C:\Program Files\Common Files\FSC\DLL 1+2 | 1 | 1 min |
| D:\Profiles\All Users\Application Data\FSC\INI | 12 | 2 min |

In a step 440, an access profile 9 is prepared from the acquired access data 8. For example, a plurality of accesses of an individual software component 12 can be compiled. It is also possible to compile all accesses monitored by the monitoring component 5 into a single access profile 9.

The access profile 9 compiled in this manner is provided for the maintenance computer 3 in a step 450. After the provision of the access profile 9 in the step 450, the method 400 terminates.

In the embodiment illustrated in FIG. 3, the individual accesses are acquired by the monitoring component 5 and interim-stored in the storage device 20. When a second message 7B for transferring the access profile 9 is recognized, all the accesses stored by the storage device 20 are compiled into an access profile 9 and transmitted to the maintenance component 3.

After receiving the fourth message 7D confirming the transmission of the access profile 9, the monitoring unit 5 can optionally delete the access data stored in the storage device 20 in order to save storage space.

Figure 5:
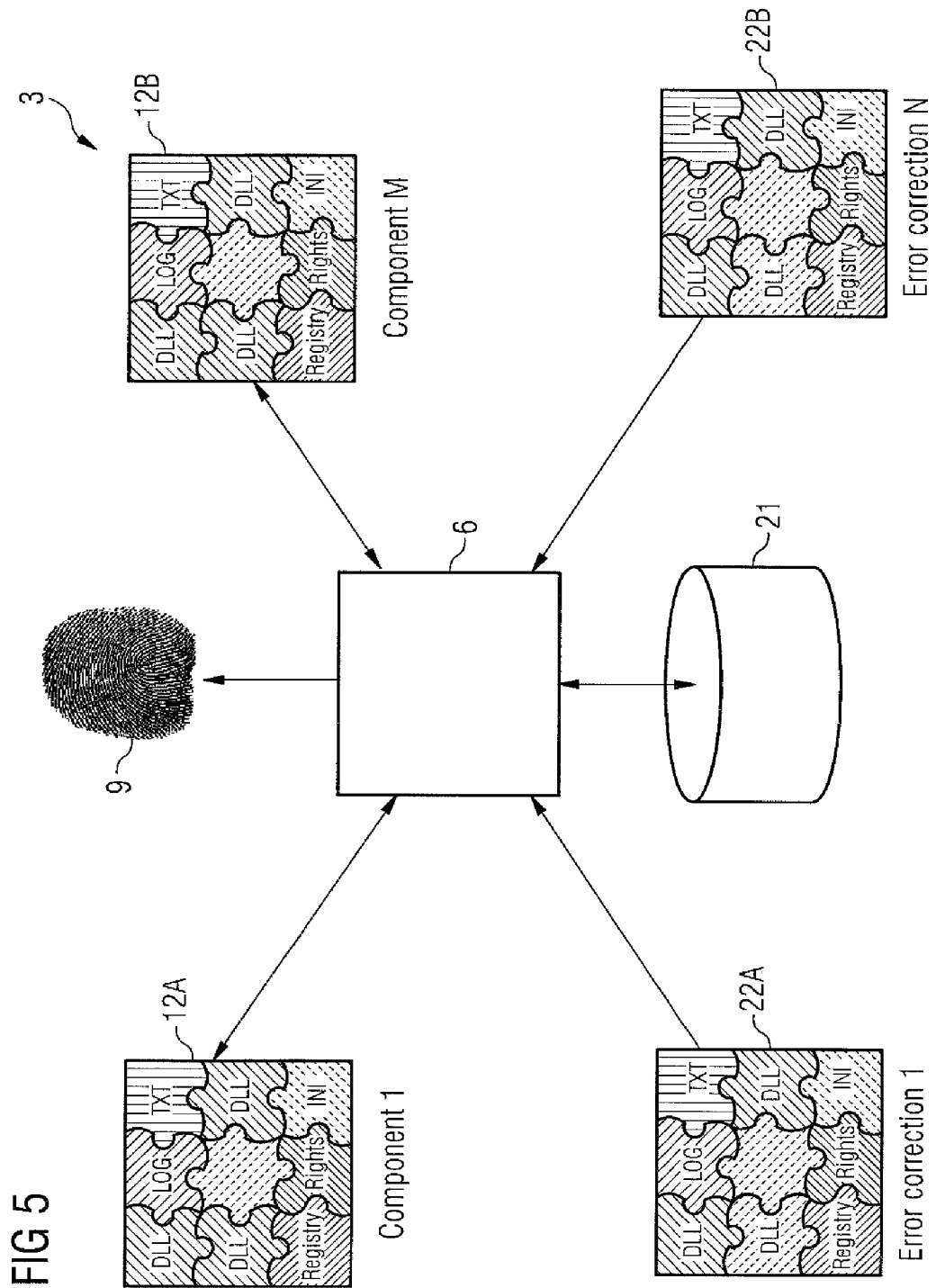
FIG. 5 shows an assessment component for assessing a configuration change.

FIG. 5 shows a schematic representation of the maintenance computer 3. The maintenance computer 3 comprises an assessment component 6 and a maintenance database 21. The maintenance computer 3 is additionally set up to acquire information on the composition of possible software components 12 and on possible configuration changes 22, where, as an example, two components 22A and 22B are shown.

In the embodiment shown in FIG. 5, the assessment component 6 is set up to analyze the composition of the software components 12A and 12B, collectively 12, and determine the effect of the configuration changes 22 on the software component 12. In database 21, the assessment component 6 can store recognized effects of the configuration changes 22 on the software components 12, for example.

The assessment component 6 is additionally set up to analyze the access profiles 9 provided by a monitoring component 5. In particular, the assessment component 6 is set up to receive a plurality of the access profiles 9 via the data network 4, and to store them in the maintenance database 21.

If one of the configuration changes 22 is to be performed by the maintenance computer 3, the compiled access profiles 9 are retrieved from the maintenance database 21 and analyzed in relation to the determined effects of the software components 12. Based on the analysis, the operating security of the computer system after performance of the tested configuration change 22 is determined.

Figure 6:
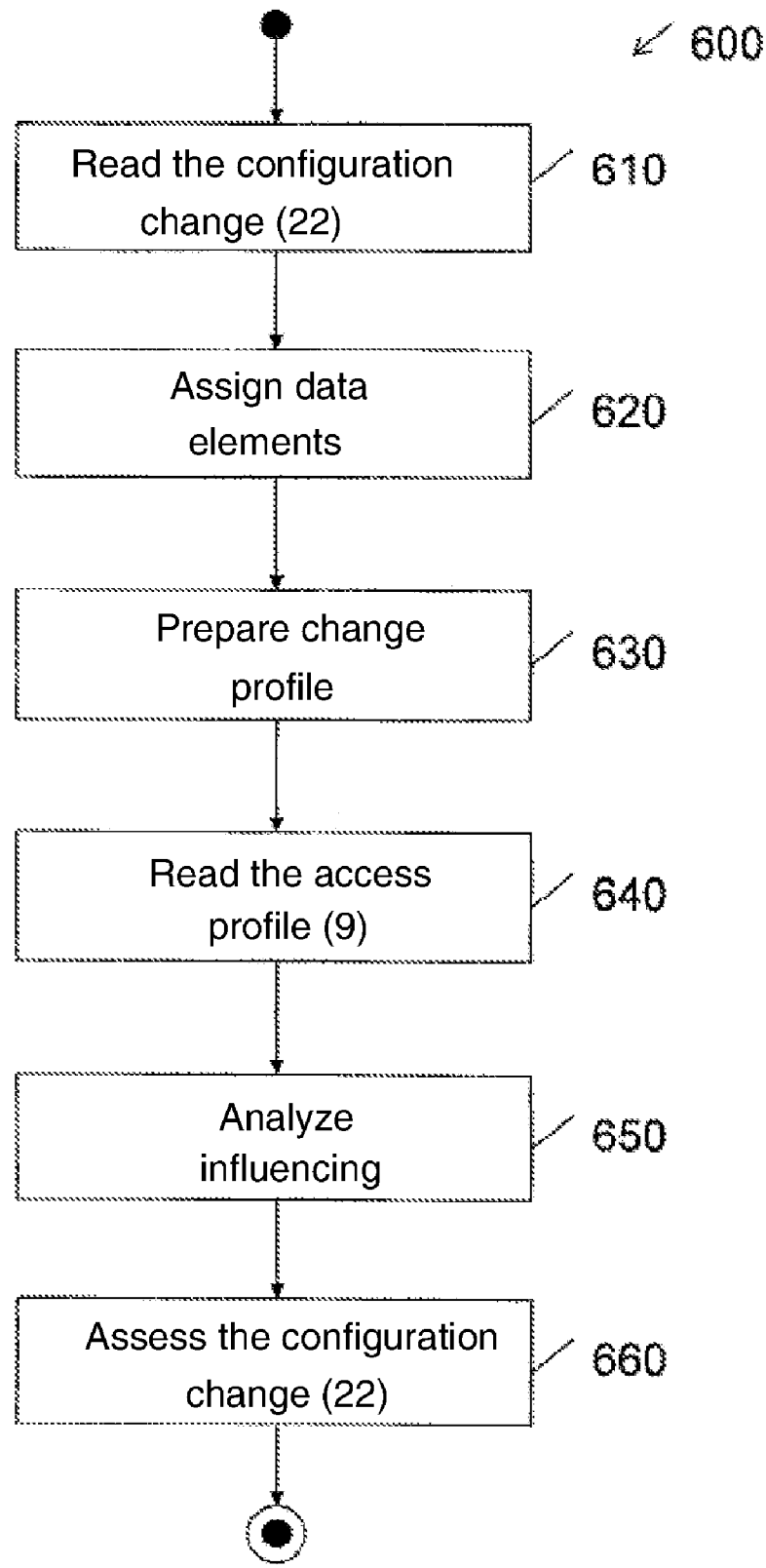
FIG. 6 shows a flowchart of a method for assessing a configuration change.

The individual steps of a method 600 for assessing a configuration change 22 are illustrated in the flowchart of FIG. 6.

In a first step 610, a configuration change 22 is read. The configuration change 22 comprises several data elements. For instance, a configuration change 22 can be constructed similarly to a software component 12.

In addition, a configuration change 22 often comprises information regarding other software components that are necessary for performing the configuration change 22 or that conflict with it. If the configuration change 22 is, for instance, an error correction for a software component 12 such as an application program, the configuration change 22 often includes indications of the versions of the software component 12 to which the error correction is applicable.

In a step 620, the individual data elements of the configuration change 22 are assigned to resources of the computer system 1. For example, it can be determined which files installed on the workstation computer 2 would be changed by an installation of an error correction.

In a step 630, a change profile is prepared based on the associated data elements. The change profile can contain information, for example, concerning which resources are additionally available or are no longer available when the configuration change 22 has been performed.

In a step 640, the at least one access profile 9 is read from the maintenance database 21. For example, the access profiles 9 of a software component 12A associated with the configuration change 22A can be read. Additional access profiles 9 of a workstation computer 2 on which the configuration change 22 is to be performed can also be read.

In a step 650, the effect of the intended configuration change 22 on the access profile or profiles 9 is analyzed.

It can be determined, for instance, which software components 12 on a workstation computer 2 are accessed particularly often. If the software component 12 required particularly frequently by the workstation computer 2 is changed or possibly even removed by the configuration change 22, the functioning of the workstation computer 2 can be greatly affected.

In this case, however, performance of the configuration change 22 on the workstation computer 2 can also be particularly urgent, if the configuration change 22 contains information that rectifies security problems that were reported by the workstation computer 2 in the past are known. For example, software manufacturers regularly provide error corrections for Web browsers that are intended to close known security leaks. After such a security leak has become publicly known, it is particularly urgent to correct it, because possibilities for attacks to exploit the security leak generally become known at the same time as the correction.

In a step 660, the effects analyzed in the step 650 are assessed. If the result of the assessment is that the operating security would be increased by performing configuration change 22 of the computer system 1, a positive assessment score is assigned to the configuration change 22. Conversely, the configuration change 22 will receive a negative assessment score if the effects determined in the step 650 can lead to a negative impact on operating security.

The assessment performed in the step 660 can be carried out for the computer system 1 as a whole. For the computer systems with several workstation computers 2, however, it is also possible to perform the assessment for one workstation computer 2. In a subsequent performance of the configuration change 22, only those workstation computers 2 for which a positive impact on operating security is to be expected from the performance of the configuration change 22 need be considered. Conversely, the workstation computers 2 for which a negative impact on operating security is to be expected can be excluded from the performance of the configuration change 22.

Figure 7A:
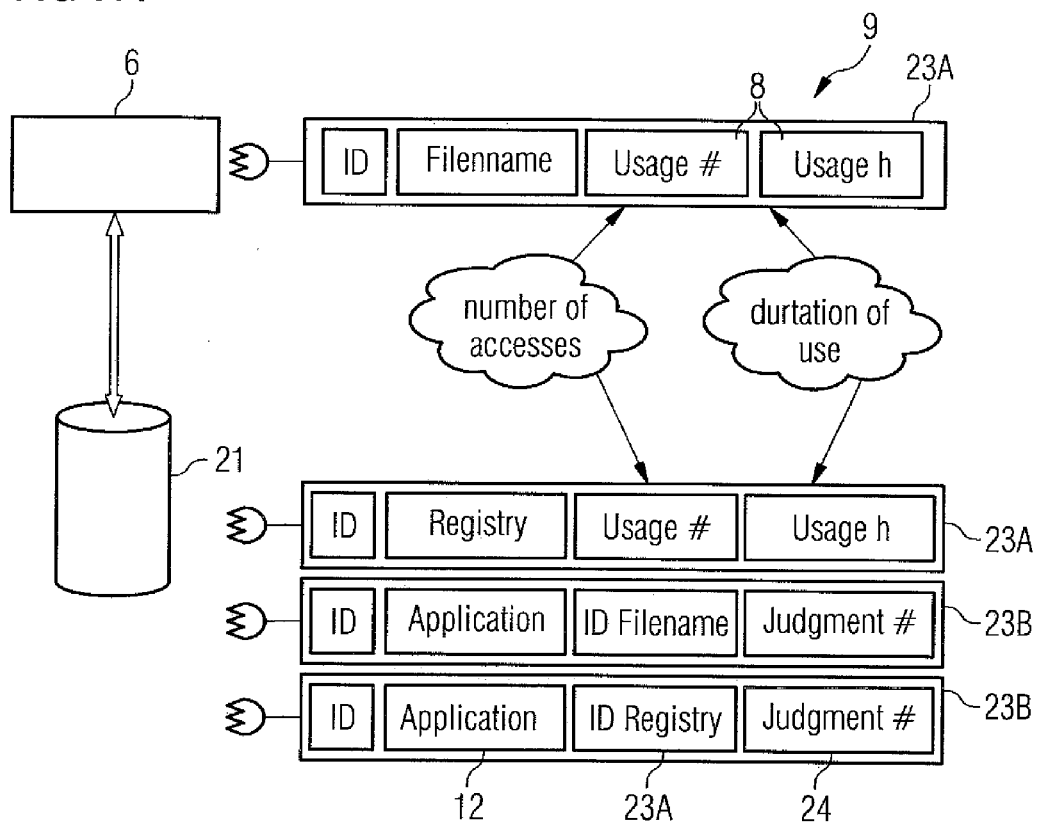
FIG. 7A shows a data model of an access profile.
Figure 7B:
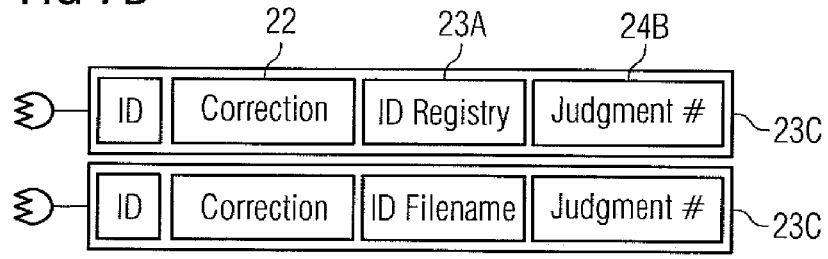
FIG. 7B shows a data model of a change profile.

FIGS. 7A and 7B show a possible data model for the maintenance database 21. In the illustrated embodiment, the maintenance database 21 contains relations. Alternatively, object-relational or object-oriented databases can be used for storing the access data 8 and the profiles 9.

FIG. 7A shows information of an access profile 9. A first data set 23A contains the respective access data 8 of an individual access to a resource. The first datasets can be directly entered into the database 21 by the monitoring component 5. Alternatively, the access data can also be extracted by the assessment component 6 from a previously transmitted access profile 9.

A first assessment score 24 is assigned by second datasets 23B to each software component 12 and each resource used by it. The first assessment score 24 is a measure of the importance of the access of the software component 12. It can be determined automatically by aggregating the first data sets 23A, for example, or manually by a service technician.

FIG. 7B shows third datasets 23C of a change profile. The third datasets 23C contain information as to which resources of one of the datasets 23A are changed by a configuration change 22 or one of the data elements of the latter. A second assessment score 24B, which indicates the weight of the respective change or of an associated risk, is assigned to each of these relations.

Figure 8:
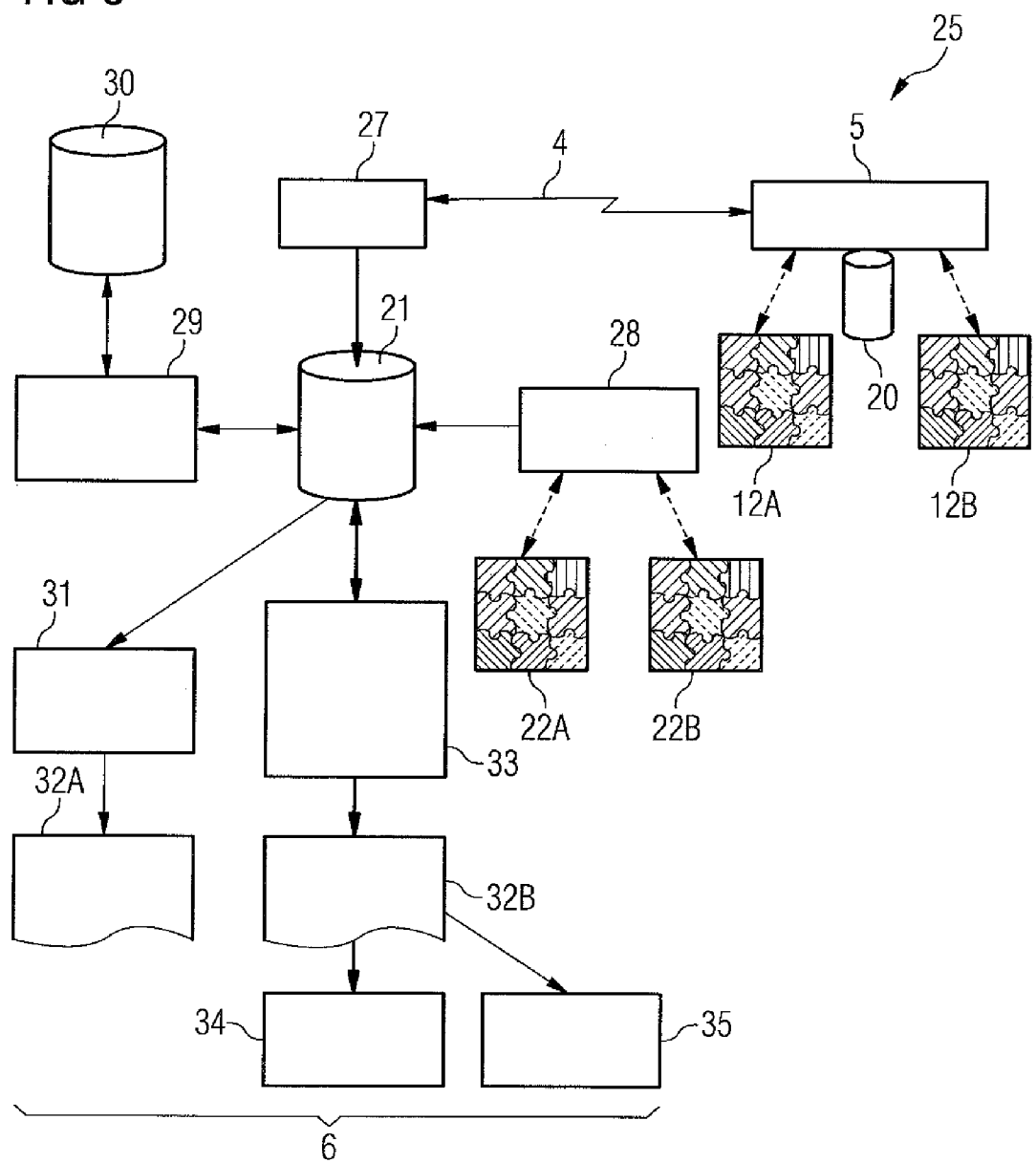
FIG. 8 shows a system architecture of a maintenance system.

FIG. 8 shows an example of a software and system architecture for a maintenance system 25 according to one implementation of the invention.

A monitoring component 5 monitors and records accesses of software components 12A and 12B. The associated access data 8 is stored on a storage medium 20 and compiled on request or regularly, and is transmitted as access profiles 9 via a data network 4.

The assessment component 6 comprises a number of modules in this embodiment. A service module 27 acquires the access profiles 9 provided by the monitoring component 5 and stores them in a suitable format in a maintenance database 21. An examination module 28 analyzes possible configuration changes 22A and 22B with respect to the data elements contained therein, and likewise stores associated information in the maintenance database 21. A so-called software management module 29 analyzes the software components 12 and stores associated version and installation information in a software management database 30.

Based on the information stored in the maintenance database 21, an inspection module 31 prepares first reports 32A, which give a systems administrator an overview of the installation status of a computer system 1, indicate deviations from a desired state, or contain error reports.

An assessment module 33 assesses possible configuration changes 22 with respect to their impact on operating security. The assessment module 33 generates second reports 32B that contain an automatically determined urgency, possible positive and negative consequences of the configuration change 22, and other information relevant to a decision. The result is supplied to a risk management module 34 and a change management module 35. The risk management module 34 determines possible risks for operational processes. The change management module 35 supports a system administrator in the performance and possibly the rollback of the configuration changes 22.

Central maintenance, particularly of extensive computer systems, is made possible by the above-described methods and systems for acquiring an access profile 9, assessing a configuration change 22, and maintaining a computer system 1. Moreover, a prioritization in the performance of the configuration changes 22 can be taken into account based on the usage profile acquired by means of the access profile 9.

For example, large software manufacturers provide a number of error corrections on predetermined dates, so-called patch days. The provided error corrections correct a number of software components 12 that could possibly be installed on a workstation computer 2. However, due to operational processes, it is often not possible to install all the provided error corrections simultaneously and on all workstation computers 2 without interfering with the operation of the computer system 1 for a considerable time. Based on the information contained in the configuration changes 22 and the acquired access profiles 9, only a configuration change 22 that is expected to provide an increase in operating security or productivity is preferentially installed.

Other error corrections, which affect only those software components 12 that are run relatively seldom in the computer system 1, can be installed at a later time, for instance overnight or on the weekend. Other configuration changes 22 that have no effect at all on the computer system 1 do not need to be installed at all, and therefore will not lead to impairment of the computer system 1.

Alongside the actual maintenance of the computer system 1, the above-described method for providing access profiles also fulfills additional functions. An overall picture of the software components 12 present on the different workstation computers 2 can be prepared by the central acquisition on a maintenance computer 3 of access profiles 9 of a plurality of workstation computers 2.

Starting from this point, a target state stored in the maintenance database 21 can be compared to an actual state acquired on a workstation computer 2 by the monitoring component 5. If the actual state and the target state deviate from one another, for instance, because the user of a workstation computer 2 has made configuration changes 22 on his own, these can be acquired on the maintenance computer 3 and rolled back if necessary.

It can additionally be recognized whether a software component 12 installed on a workstation computer 2 is required at all at the associated workstation computer. For example, it can be recognized by a central acquisition of access profiles 9 whether an application program installed on every workstation computer 2 is only ever launched on a few of the workstation computers 2. In this case, financial expenditures incurred for the acquisition or usage of the software components 12 can be avoided by removing the software components 12 from those workstation computers 2 in which they are seldom or never run.

The systems and arrangements illustrated in FIGS. 1A, 3, 5 and 8, as well as the data models illustrated in FIGS. 7A and 7B have only the character of examples. It goes without saying that the individual components of the systems described can be put together or distributed in various manners, without an essential change of their function resulting thereby.

The sequence of steps illustrated in FIGS. 1B, 2, 4 and 6 represents only one example of an implementation of the respective methods. The steps illustrated therein can naturally also be executed in many other orders or parallel to one another in order to improve or simplify processing. Moreover, several steps can be combined into a single step. An individual step can also be subdivided into a series of several steps.

What is claimed is:

1. A method for maintaining a computer system comprising a monitoring component and an assessment component operating on a processor thereof, the method comprising:

acquiring at least one access profile for at least one software component installed on the computer system, wherein the at least one access profile is compiled by the monitoring component and comprises information concerning accesses of the at least one software component to resources of the computer system;

determining at least one change profile for at least one configuration change by the assessment component, wherein the at least one change profile comprises information concerning which resources of the computer system are additionally available or are no longer available if the at least one configuration change will be performed;

assessing at least one determined change profile with respect to an operating security of the computer system based on the least one access profile by the assessment component; and performing the at least one configuration change only if the assessing yields an improvement of the operating security.

2. The method according to claim 1, wherein the at least one configuration change comprises at least one error correction for a software component to be corrected, the error correction being installed on the computer system only if the at least one access profile comprises at least one access to the software component to be corrected.

3. The method according to claim 1, wherein determining the at least one change profile comprises determining incompatibility information for the at least one configuration change with respect to an affected software component, the at least one configuration change being performed in the computer system only if the at least one access profile comprises no accesses to the affected software component.

4. The method according to claim 1, wherein determining the at least one change profile comprises determining a priority for the at least one configuration change, the at least one configuration change being performed in the computer system only if the priority exceeds a predetermined threshold value.

5. The method according to claim 1, wherein acquiring the at least one access profile comprises acquiring a plurality of access profiles for a plurality of software components and wherein assessing the at least one determined change profile comprises determining which of the plurality of software components are influenced by the at least one configuration change.

6. The method according to claim 1, wherein the computer system comprises at least one workstation computer and at least one maintenance computer that are coupled to one another via a data network, wherein the at least one access profile is transmitted by the at least one workstation computer to the at least one maintenance computer.

7. The method according to claim 6, wherein the computer system comprises a plurality of workstation computers, each workstation computer transmitting at least one access profile to the maintenance computer, and the maintenance computer determining which workstation computers will be affected by the at least one configuration change.

8. The method according to claim 7, wherein assessment of the operating security is determined separately for different groups of workstation computers, and the at least one configuration change is performed only on the workstation computers of those groups for which an improvement of the operating security was determined.

9. The method according to claim 7, further comprising determining a set of critical software components on the basis of the at least one access profile of the plurality of workstation computers, and wherein an influence of the at least one configuration change on the critical software components is determined in the step of assessing the operating security.

10. The method according to claim 1, further comprising:
determining a first assessment score for the operating security of the computer system before performing the at least one configuration change;
determining a second assessment score for the operating security after performing the at least one configuration change; and
assigning a quality score to the at least one configuration change based on the first and second assessment scores.

11. The method according to claim 10, further comprising:
comparing the quality score to a predetermined target value; and
if the quality score falls below the predetermined target value, rolling back the at least one configuration change.

12. The method according to claim 10, further comprising taking into account the quality score in the assessment of an additional configuration change.

13. The method of claim 1, wherein compiling the at least one access profile by the monitoring component comprises:
monitoring accesses to the resources of the computer system;
assigning the monitored accesses to the at least one software component from which the accesses originate that is installed on the computer system;
acquiring access data of the assigned accesses;
preparing the least one access profile comprising the acquired access data; and
providing the prepared at least one access profile to an assessment component of the computer system.

14. The method according to claim 13, wherein monitoring accesses comprises monitoring accesses to files, file systems, configuration data, devices, device drivers or other software components.

15. The method according to claim 13, wherein acquiring access data comprises acquiring an access frequency, an access duration, an access sequence or an access dependency.

16. The method according to claim 13, further comprising determining a number and type of software components being used based on the access data.

17. A method for assessing a configuration change in a computer system with a processor thereof, the method comprising:
reading a configuration change comprising a plurality of data elements;
assigning the data elements to resources of the computer system;
preparing a change profile for the configuration change based on the assigned data elements, wherein the change profile comprises information concerning which resources of the computer system are additionally available or are no longer available if the configuration change will be performed;
reading an access profile of a software component compiled by a monitoring component operating on the processor comprising a plurality of access data associated with the software component to resources of the computer system;
analyzing which of the plurality of access data of the access profile is influenced by the prepared change profile, and
assessing the configuration change with respect to operating security of the computer system based on the analysis of the plurality of access data.

18. A computer system, comprising:
at least one workstation computer with a monitoring component and at least one other installed software component, the monitoring component being set up to prepare an access profile for the at least one other installed software component according to a method comprising:
monitoring accesses to resources of the computer system;
assigning the monitored accesses to the at least one other installed software component from which the accesses originate;
acquiring access data of the assigned accesses;
preparing the access profile comprising the acquired access data, wherein the prepared access profile comprises information concerning accesses of the at least one installed software component to the resources of the computer system; and
providing the access profile to an assessment component of the computer system;
at least one maintenance computer with the assessment component, the assessment component being set up to assess a configuration change based on the access profile prepared according to a method comprising:
acquiring the access profile for the at least one installed software component;

determining a change profile for the configuration change, wherein the change profile comprises information concerning which resources of the computer system are additionally available or are no longer available if the configuration change will be performed;

assessing the change profile with respect to the operating security of the computer system based on the access profile; and a data network that is coupled to the at least one workstation computer and to the at least one maintenance computer, and is set up to transmit the access profile from the at least one workstation computer to the at least one maintenance computer.

19. The computer system according to claim 18, further comprising at least one database set up for storing the access profile and/or change profile.

20. A computer program product stored on a non-transitory storage medium comprising executable program code, wherein a method is performed by a computer system during execution of the program code on the computer system, the method comprising:

acquiring at least one access profile for at least one software component installed on the computer system, wherein the at least one access profile comprises information concerning accesses of the at least one software component to resources of the computer system;

determining at least one change profile for at least one configuration change, wherein the at least one change profile comprises information concerning which resources of the computer system are additionally available or are no longer available if the at least one configuration change will be performed;

assessing at least one determined change profile with respect to operating security of the computer system based on the least one access profile; and performing the at least one configuration change only if the assessing yields an improvement of the operating security.

* * * * *